United States Patent
Schmidt et al.

(10) Patent No.: US 6,263,673 B1
(45) Date of Patent: Jul. 24, 2001

(54) METHOD FOR OPERATING A SUPERCHARGED INTERNAL COMBUSTION ENGINE AND DEVICE FOR THIS PURPOSE

(75) Inventors: Erwin Schmidt, Baltmannsweiler; Siegfried Sumser, Stuttgart, both of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/431,835

(22) Filed: Nov. 2, 1999

(30) Foreign Application Priority Data

Nov. 5, 1998 (DE) .............................. 198 51 028

(51) Int. Cl.⁷ .................................................. F02B 33/44
(52) U.S. Cl. ................................ 60/612; 60/602; 123/562
(58) Field of Search ........................ 60/612, 602; 123/562

(56) References Cited

U.S. PATENT DOCUMENTS 4,422,296 * 12/1983 Dinger et al. ........................... 60/612
4,982,567 * 1/1991 Hashimoto et al. ................... 60/612
5,005,359 * 4/1991 Tashima et al. ....................... 60/612
5,035,114 * 7/1991 Shibata et al. ........................ 60/612
5,036,663 * 8/1991 Akagi et al. .......................... 60/612
5,140,817 * 8/1992 Matsuda et al. ...................... 60/612
5,168,707 * 12/1992 Yoshioka et al. ..................... 60/612

FOREIGN PATENT DOCUMENTS 4310148    10/1994 (DE) .
196 16 555  2/1998 (DE) .

* cited by examiner

Primary Examiner—Thomas Denion
Assistant Examiner—Thai-Ba Trieu
(74) Attorney, Agent, or Firm—Mark P. Calcaterra

(57) ABSTRACT

In order to increase the operating reliability by means of simple measures in a method for operating a supercharged internal combustion engine which has two exhaust-gas turbochargers arranged in parallel, in each case only one exhaust-gas turbocharger is actively put into operation, the actual value of a characteristic quantity is measured and is compared with a predeterminable desired value, and, in the event of an inadmissible deviation of the actual value from the desired value, a change-over is made between the exhaust-gas turbochargers by means of the control signal.

22 Claims, 1 Drawing Sheet

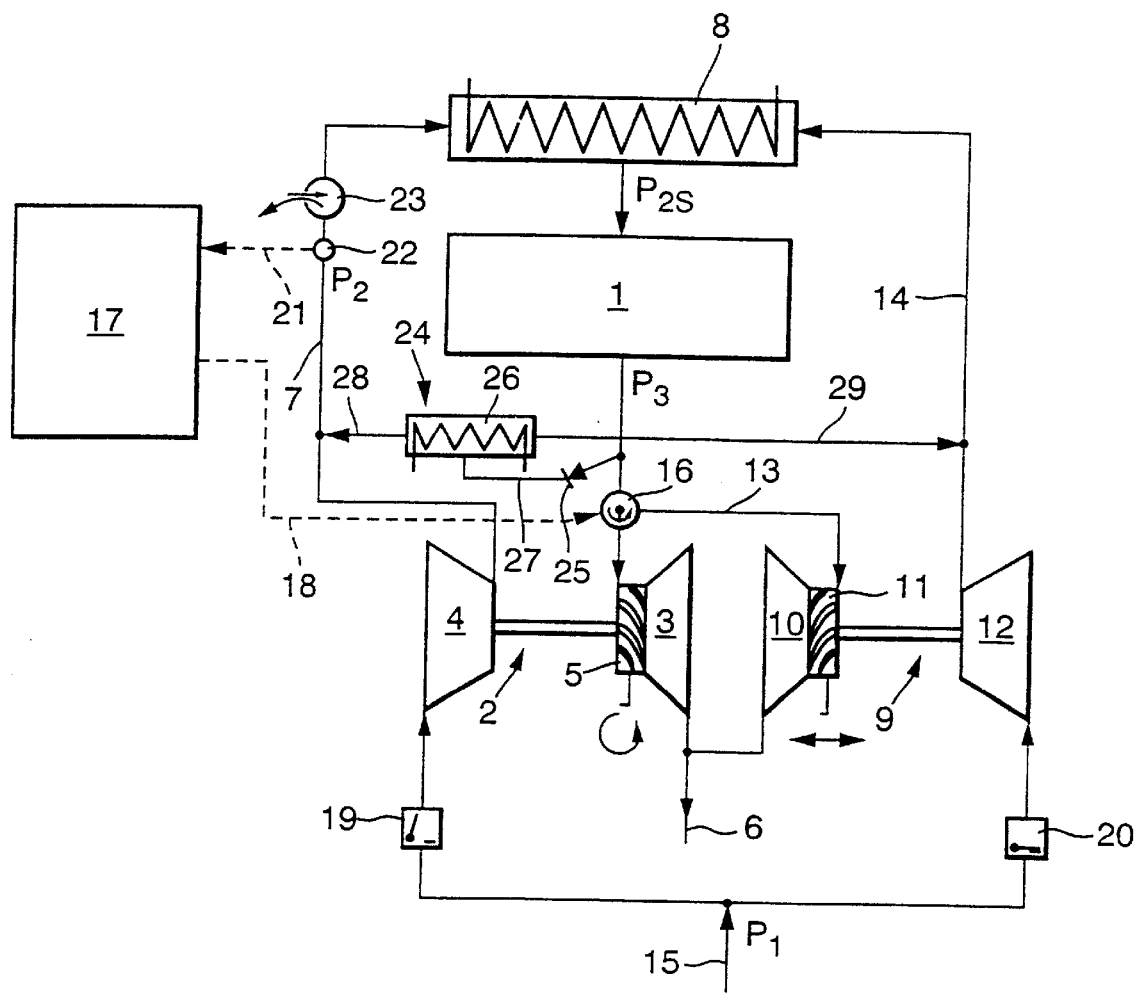

METHOD FOR OPERATING A SUPERCHARGED INTERNAL COMBUSTION ENGINE AND DEVICE FOR THIS PURPOSE

The invention relates to a method for operating a supercharged internal combustion engine and to a device for this purpose.

DE 43 10 148 A1 discloses a supercharged internal combustion engine with two exhaust-gas turbochargers arranged in parallel. Arranged in the charge-air line of a supercharger is a regulatable stop valve which is changed into the opening or the closing position depending on the operating state of the internal combustion engine. When the stop valve is in the closing position, the respective supercharger is cut off from the charge-air supply, whereas, in the opening position, both superchargers participate in the supply of charge air. Depending on the setting of the stop valve, an adjustable overall output of the two superchargers, with correspondingly different boost pressures, is generated.

The position of the stop valve is regulated as a function of the engine speed. In the lower speed range, the stop valve is in the closing position, and the only exhaust-gas turbocharger which operates is the one which is not cut off from the charge-air supply and which is designed as a small supercharger of low inertia. On account of the low inertia, the compressor of the smaller supercharger builds up a higher boost pressure in the lower speed range than would be possible in this speed range with of a larger compressor.

Beyond a medium speed, the stop valve is opened, and the second supercharger is cut in and takes over an increasing proportion of the supply of charge air.

The advantage of this arrangement is that the small exhaust-gas turbocharger can be designed optimally for low speeds. The situation where the larger supercharger enters the compressor pumping range at low speeds is avoided. By contrast, at higher speeds, the higher output of the larger supercharger can be utilized. Altogether, high overall efficiency is achieved thereby.

The problem on which the invention is based is to increase the operating reliability of supercharged internal combustion engines by means of simple measures.

SUMMARY OF THE INVENTION

Turbochargers are increasingly used not only in the fired operating mode, but also in the engine-braking mode, in which very high power values may be generated. In order, if a turbocharger fails, to avoid a sudden power drop, particularly in the engine-braking mode, and to prevent a dangerous situation, according to the innovation the exhaust-gas turbochargers are not operated simultaneously, but only individually, thereby considerably increasing the degree of safety against a supercharging failure. The two exhaust-gas turbochargers connected in parallel give the supercharged internal combustion engine a redundant design.

One exhaust-gas turbocharger advantageously performs the function of a main supercharger and the second exhaust-gas turbocharger the function of a reserve supercharger which is used only in emergencies or at regular intervals for a safety check or according to another predeterminable mode.

As the criterion for changing over between the turbochargers, a characteristic quantity characterizing the operation of the internal combustion engine is measured and is compared with a desired value. In the event of an inadmissible deviation, a control signal is generated in a regulating and control unit in order to actuate a change-over device, via which one of the superchargers can be cut off and the other supercharger cut in. A state variable of the internal combustion engine may be adopted as the characteristic quantity, for example the boost pressure, the charging speed of the currently activated supercharger, the mass air flow conveyed into the intake tract or the turbine inlet pressure; these state variables can be determined at low outlay by means of sensors and signal generators and can be compared with a predetermined or calculated desired value in the regulating and control unit.

The time may also be taken into account as a characteristic quantity, in that switching back and forth between the superchargers takes place after a predetermined timespan has elapsed. This may either be carried out for the purpose of cutting in the reserve supercharger for a short timespan, even during regular operation, without an emergency, in order to test its functioning capacity; it may also be expedient, however, to operate the two superchargers alternately, in order to achieve a uniform load on both superchargers and increase the overall lifetime of the apparatus; in this design, both superchargers are treated as being of equal rank and both superchargers preferably have an identical design.

Mixed operation is also possible, in which, basically, there is a change-over to the second supercharger in emergencies only, when a state-variable limit value is exceeded, but, to check functioning capacity, there is also normally a change-over to the reserve supercharger for a usually short time span during regular operation.

The method and the apparatus can be used both in the engine-braking mode and in the fired drive mode. In order to achieve high braking powers, preferably at least one turbine, in particular the turbine of the main supercharger, is equipped with variable turbine geometry for the variable setting of the effective turbine cross section; both turbines expediently have a variable turbine geometry.

In the engine-braking mode, the variable turbine geometry is changed into a build-up position with reduced turbine cross section in order to increase the exhaust-gas back pressure. The built-up exhaust gas flows with high momentum between the remaining flow ducts of the turbine geometry and impinges onto the turbine wheel which is driven and which transmits power to the compressor, with the result that the combustion air sucked in is raised to an increased boost pressure, so that an increased pressure prevails both on the inlet side and on the outlet side of the cylinders of the internal combustion engine. In the engine-braking mode, the piston has to perform compression work against the high excess pressure in the exhaust-gas tract during the compression and push-out stroke, thereby achieving a high braking action.

Malfunctions of the turbocharger currently used can be detected, for example, via a desired-value/actual-value comparison of the state variable considered or of a quantity derived from the state variable considered. If the change in time of the state variable, in particular the boost pressure, exceeds a limit value and/or the level of the state variable falls short of a lower limit, there is, with high probability, damage to the turbocharger. The actuation of the change-over device and the rapid change to the second turbocharger make it possible to avoid a power breakdown both in the fired mode and in the engine-braking mode. The second turbocharger remains in operation until repair measures are carried out on the first turbocharger and the regulating and control unit is reset to the initial state.

A malfunction detected in the regulating and control unit is expediently documented and indicated.

In an advantageous development, the maximum permissible boost pressure is limited to a maximum value in order to prevent component overload, which may occur, for example, due to a jammed turbine geometry in the engine-braking mode and the resulting sharply rising turbine power at an increasing engine speed. In order to limit the boost pressure, a safety valve is provided downstream of the compressors in the intake tract and is expediently arranged in addition to the redundant design with two parallel exhaust-gas turbochargers to be operated alternately. If appropriate, however, boost-pressure limitation by means of the safety valve is also employed in internal combustion engines with only one turbocharger or in internal combustion engines with two turbochargers which may also be operated simultaneously as a function of the operating state.

BRIEF DESCRIPTION OF THE DRAWINGS

Further advantages and expedient embodiments may be gathered from the further claims, the figure description and the drawing, in which a supercharged internal combustion engine with two exhaust-gas turbochargers is illustrated diagrammatically.

The internal combustion engine 1, in particular the internal combustion engine of a commercial vehicle, has an exhaust-gas turbocharger 2, with a turbine 3, in the exhaust tract 6 and a compressor 4 in the intake tract 7. The turbine 3 is equipped with variably adjustable turbine geometry 5, in particular as a guide-blade cascade with rotary blades. The turbine 3 is driven by the exhaust gases in the exhaust tract 6, which are under the exhaust-gas back pressure p3, between the cylinder outlet of the internal combustion engine and the turbine inlet of the turbine 3 and, in turn, drives, via a shaft, the compressor 4 which compresses the fresh air sucked in at atmospheric pressure $P_1$ to an increased pressure $P_2$. The compressed air is cooled in a charge-air cooler 8 downstream of the compressor 4 and is subsequently supplied, together with the boost pressure $P_{2s}$, to the intake pipe of the internal combustion engine 1. The increased boost pressure leads to an increase in the engine drive power.

The exhaust-gas turbocharger 2 may also be utilized in the engine-braking mode in order to generate engine-braking power. For this purpose, the variable turbine geometry 5 of the turbine 3 is changed into a built-up position, in which the effective turbine inlet cross section is reduced. An increased exhaust-gas back pressure thereupon builds up, and the exhaust gas flows at increased velocity through the remaining open ducts of the variable turbine geometry and impinges onto the turbine wheel driving the compressor 4, with the result that the compressor builds up an excess pressure in the intake tract 7. At the same time, brake valves are opened at the cylinder outlet of the internal combustion engine 1, so that the air compressed in the cylinder can be blown off into the exhaust tract 6.

The braking power can be influenced by the position of the variable turbine geometry 5 and the resulting adjustment of the turbine inlet cross section.

The variable turbine geometry can be implemented by means of a guide-blade cascade in the turbine inlet cross section with rotatable blades. In this case, the variation in cross section is brought about by rotation of the blades. Alternatively, the turbine may be equipped with an axially displaceable guide-blade cascade in the turbine inlet cross section. In a further version, the turbine may be equipped with a flap in the inlet and with acceleration ducts which emanate upstream of the inlet and which terminate directly downstream of the open turbine back. In this version, too, the exhaust-gas stream acting on the turbine wheel is variably adjustable.

A further exhaust-gas turbocharger 9 is arranged in parallel to the exhaust-gas turbocharger 2. The second supercharger 9 has a turbine 10 which, like the first supercharger 2, is equipped with variable turbine geometry 11, in an exhaust-gas line segment 13 which is arranged parallel to the exhaust tract 6 having the first turbine 3. The exhaust-gas line segment 13 having the second turbine 10 opens into the exhaust tract 6 again downstream of the turbine 10. Expediently, in a simple version, the variable turbine geometry 11 is equipped with an axial slide or is designed as a flap turbine. If appropriate, however, a version with a guide-plate cascade having rotary blades may also be considered.

The second compressor 12 driven by the second turbine 10 is located in an intake line 14 running parallel to the intake tract 7. The intake tract 7 and the parallel intake line 14 are fed with fresh air, upstream of the compressors 4 and 12 respectively, by a common air inlet 15. Non-return valves 19, 20 are provided, both upstream of the first compressor 4 and upstream of the second compressor 12, in the respective line segments, the said non-return valves opening in the intake direction of the combustion air and closing in the opposite direction. The intake line 14 opens into the charge-air cooler 8 downstream of the second compressor 12.

In the region where the waste-gas line segment 13 branches off from the exhaust tract 6 is provided a change-over device 16 which can be switched between a position clearing the exhaust tract through the first turbine 3 and a position clearing the exhaust-gas line segment through the second turbine 10. Depending on the switching position of the change-over device 16, the entire exhaust-gas stream is led either solely through the first turbine 3 or solely through the second turbine 10.

The change-over device 16 is actuated by means of a control signal which is generated in a regulating and control unit 17 and which is supplied to the change-over device 16 via a signal line 18. Via a further signal line 21, the boost pressure $P_2$, which is recorded in a signal generator or sensor 22 in the intake tract 7, is supplied as an input signal to the regulating and control unit 17. Via further signal lines which are not depicted, the regulating and control unit 17 receives input signals with additional information on the operating state of the internal combustion engine 1, in particular on the load, engine speed, mass air flow sucked in, speed of the exhaust-gas turbochargers 2 and 9, turbine inlet pressure, etc., and on whether the internal combustion engine is in the engine-braking mode or in the fired drive mode. The regulating and control unit 17 also detects the position of the variable turbine geometry in the turbines 3 and 12 or generates actuating signals for the state-dependent adjustment of the variable turbine geometry.

The exhaust-gas turbocharger 2 is used as the main supercharger and the exhaust-gas turbocharger 9 as the reserve supercharger. During regular operation, both in the fired drive mode and in the engine-braking mode, only the main supercharger 2 is used, insofar as there is no malfunction; during regular operation, the change-over device 16 is in a position supplying the main turbine 3 with exhaust gas. A check of one or more system-state variables or oJ other system-characteristic quantities, such as, for example, the time, is carried out in the regulating and control unit 17 at advantageously regular intervals. If a measured state variable deviates from the given or calculated desired value to an inadmissible extent, it is presumed that there is damage in the main supercharger 2. The regulating and control unit 17 thereupon generates a control signal, by means of which the change-over device 16 is changed over, so that the entire exhaust-gas stream is led through the exhaust-gas line segment 13 having the reserve turbine 10. At the same time, a fault message or a fault entry can be made in the regulating and control unit 17, and the driver can be asked to visit a garage.

The control signal for changing over from the main supercharger to the reserve supercharger may also be generated when a predetermined time span has elapsed. As a result, the reserve supercharger 9 is put into operation for short periods in order to check functional capacity from time to time.

In another version, it may also be expedient to operate both superchargers 2, 9 with equal rank and alternately according to a predetermined mode, in order to lower the load on each individual supercharger and increase the overall lifetime of the apparatus. In this version, the two superchargers advantageously have an identical design.

With the reserve supercharger 9 activated, the non-return valve 19 in the intake tract 7 is in the closing position because of the vacuum in the lower line segment of the intake tract 7. Correspondingly, with the main supercharger 2 activated, the second non-return valve 20 in the parallel intake line 14 is in the closing position.

In a modified version, the intake line 7 having the second compressor 12 may also be laid in place in such a way that only the first compressor 4 in the intake tract 7 is bridged, the intake line branching off directly upstream of the first compressor 4 and opening into the intake tract 7 again downstream of the compressor 4. In this case, the intake line having the second compressor forms a bypass for the first compressor.

In an expedient version, a safety valve 23 is arranged downstream of the first compressor 4 in the intake tract 7 and, for the relief of pressure, can be changed, as a function of the boost pressure $P_2$, into a position diverting charge air.

If an inadmissibly high boost pressure $P_2$ is recorded in the regulating and control unit 17, the safety valve 23 is opened until the boost pressure falls below the predetermined limit value.

Furthermore, an exhaust-gas recirculation device 24 is provided which comprises an exhaust-gas recirculation valve 25 in the exhaust tract 6 upstream of the first turbine 3, an exhaust-gas cooler 26 and various exhaust-gas supply and discharge lines 27, 28 and 29. The exhaust-gas recirculation valve 25 is controlled via the regulating and control unit 17. When the exhaust-gas recirculation valve 25 is in the opening position, some of the exhaust gas is diverted from the exhaust tract 6, supplied to the exhaust-gas cooler 26 via the supply line 27 and, after being cooled, supplied via the discharge lines 28, 29 to the intake tract 7 downstream of the first compressor 4 or to the intake line 14 downstream of the second compressor 12.

What is claimed is:

1. A method for operating a supercharged internal combustion engine which has two exhaust-gas turbochargers arranged in parallel, a regulating and control unit operative to generate a control signal for placing the exhaust-gas turbochargers into and out of operation as a function of characteristic quantities of engine operation, the method comprising the steps of:
    a) measuring an actual value of a preselected characteristic quantity;
    b) comparing the actual value with a predetermined desired value;
    c) generating the control signal to generate a change-over in operation between the exhaust-gas turbochargers whenever the comparing step indicates an inadmissible deviation of the actual value from the desired value; and
    d) characterized in that the measurement of the characteristic quantity is carried out in an engine-braking mode.

2. The method according to claim 1, characterized in that, as the characteristic quantity, a state variable of the internal combustion engine is measured and is compared with a desired value.

3. The method according to claim 2, characterized in that the state variable comprises boost pressure.

4. The method according to claim 2, characterized in that the state variable comprises charging peed of the currently active exhaust-gas turbocharger.

5. The method according to claim 2, characterized in that the state variable comprises mass air flow in an intake tract.

6. The method according to claim 2, characterized in that the change between the exhaust-gas turbochargers takes place when a change in time of the state variable exceeds a limit value.

7. The method according to claim 1, characterized in that time is taken into account as a characteristic quantity.

8. The method according to claim 1, characterized in that an effective flow cross section of at least a turbine of one exhaust-gas turbocharger is variably adjustable.

9. The method according to claim 8, characterized in that the effective flow cross section of both turbines is variably adjustable.

10. The method according to claim 1, characterized in that maximum permissible boost pressure is limited to a maximum value.

11. The method of claim 1, further characterized in that a change-over from one exhaust-gas turbocharger to the other is carried out in the engine-braking mode.

12. A method for operating a supercharged internal combustion engine which has two exhaust-gas turbochargers arranged in parallel, a regulating and control unit operative to generate a control signal for placing the exhaust-gas turbochargers into and out of operation as a function of characteristic quantities of engine operation, the method comprising the steps of:

a) measuring an actual value of a preselected characteristic quantity;
 b) comparing the actual value with a predetermined desired value;
 c) generating the control signal to generate a change-over in operation between the exhaust-gas turbochargers whenever the comparing step indicates an inadmissible deviation of the actual value from the desired value; and
 d) characterized in that the measurement of the characteristic quantity is carried out in a fired drive mode.

13. The method of claim 12, further characterized in that a change-over from one exhaust-gas turbocharger to the other is carried out in the fired drive mode.

14. The method according to claim 12, characterized in that, as the characteristic quantity, a state variable of the internal combustion engine is measured and is compared with a desired value.

15. The method according to claim 14, characterized in that the state variable comprises boost pressure.

16. The method according to claim 15, characterized in that the state variable comprises charging speed of the currently active exhaust-gas turbocharger.

17. The method according to claim 15, characterized in that the state variable comprises mass air flow in an intake tract.

18. The method according to claim 14, characterized in that the change between the exhaust-gas turbochargers takes place when a change in time of the state variable exceeds a limit value.

19. The method according to claim 12, characterized in that time is taken into account as a characteristic quantity.

20. The method according to claim 12, characterized in that an effective flow cross section of at least a turbine of one exhaust-gas turbocharger is variably adjustable.

21. The method according to claim 20, characterized in that the effective flow cross section of both turbines is variably adjustable.

22. The method according to claim 12, characterized in that maximum permissible boost pressure is limited to a maximum value.

* * * * *